United States Patent [19]

Morse

[11] Patent Number: 4,501,936
[45] Date of Patent: * Feb. 26, 1985

[54] PROTECTIVE COVER FOR TELEPHONE

[75] Inventor: Milton Morse, Fort Lee, N.J.

[73] Assignee: APM Corporation, Englewood, N.J.

[ * ] Notice: The portion of the term of this patent subsequent to Mar. 20, 2001 has been disclaimed.

[21] Appl. No.: 381,905

[22] Filed: May 25, 1982

Related U.S. Application Data

[63] Continuation-in-part of Ser. No. 236,757, Feb. 23, 1981, Pat. No. 4,438,300, Ser. No. 261,647, May 7, 1981, abandoned, Ser. No. 286,063, Jul. 23, 1981, abandoned, and Ser. No. 299,509, Sep. 4, 1981, Pat. No. 4,436,965.

[51] Int. Cl.³ .............................................. H01H 9/02
[52] U.S. Cl. ................................. 179/184; 200/302.2; 200/333
[58] Field of Search ................ 179/184, 186; D14/66; 200/302, 333, 340

[56] References Cited

U.S. PATENT DOCUMENTS

| | | | |
|---|---|---|---|
| 1,600,603 | 9/1926 | Schwegler | 250/465.1 |
| 3,749,870 | 7/1973 | Oakes | 200/302 |
| 4,028,257 | 3/1978 | Bagley | 340/365 S |
| 4,293,764 | 10/1981 | Amrheim | 200/340 |

OTHER PUBLICATIONS

"Keyboard Cover", *Telephony*, Jul. 20, 1981, p. 94.

*Primary Examiner*—Stafford D. Schreyer
*Assistant Examiner*—L. C. Schroeder
*Attorney, Agent, or Firm*—Edward R. Weingram

[57] ABSTRACT

A protective cover for the push-button array of a push-button telephone set having a planar surface through which the push-buttons extend, comprise a flexible elastomeric sheet having at least one recessed portion with side walls forming a pocket which overlies each of the push-buttons on said telephone set and permits individual displacement of the underlying telephone set push-buttons. The sheet has a skirt portion extending laterally beyond the side walls of the pocket and the sheet is continuous between its lateral edges, whereby the entire push-button array is overlaid by the cover and thereby protected against spilled liquids or other environmental hazards. Surrounding the sheet is a metal frame having a channel on the internal periphery into which the sheet extends and is permanently secured.

Strips of adhesive material, preferably a continuous strip, is provided on the underside of the sheet for permanently securing the sheet and metal frame to the planar surface of the telephone set to prevent its removal by unauthorized persons. A removable cover is placed over the adhesive strips which is removed before attachment of the cover to the planar surface.

16 Claims, 8 Drawing Figures

FIG. 1
PRIOR ART
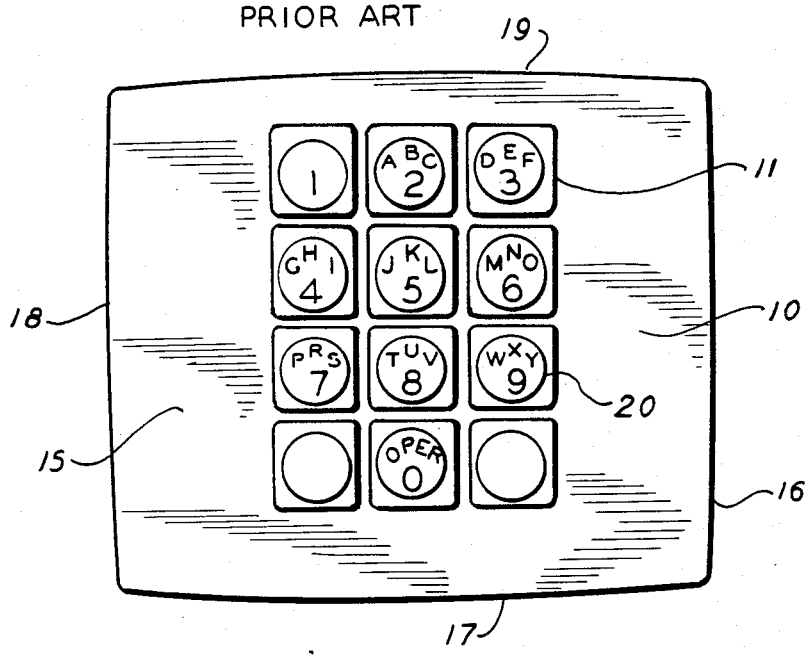
FIG. 2
PRIOR ART
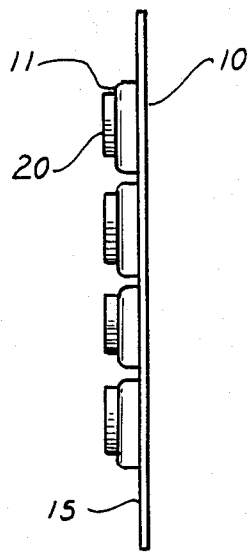
FIG. 3
PRIOR ART
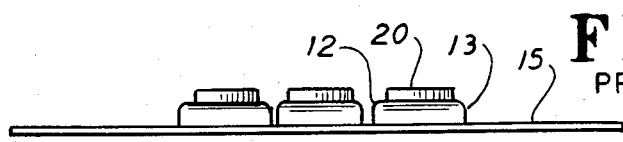
FIG. 4
PRIOR ART
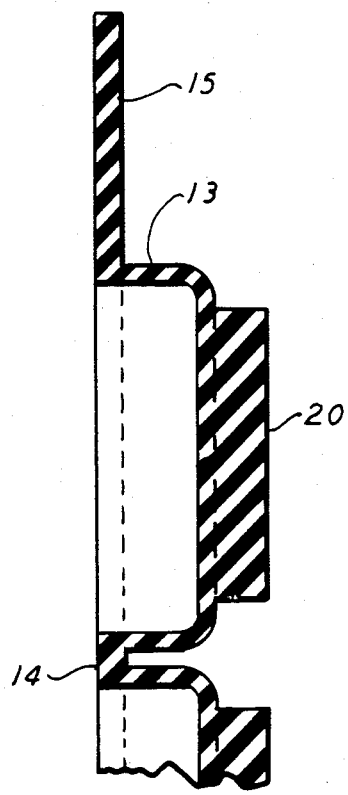
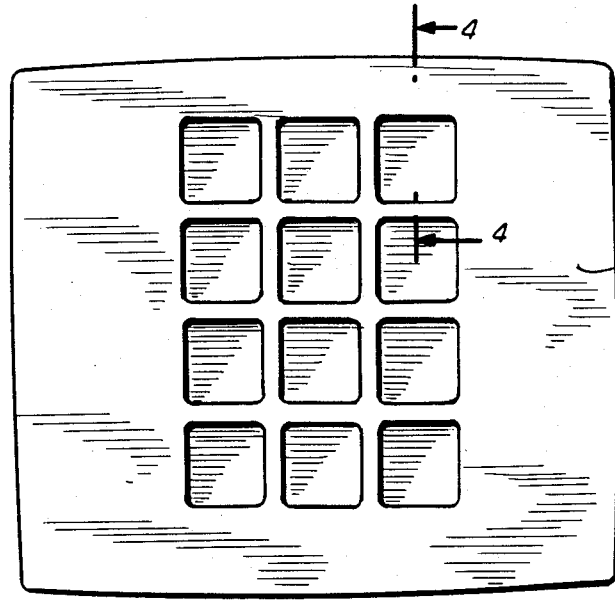
FIG. 5
PRIOR ART 4,501,936

PROTECTIVE COVER FOR TELEPHONE

FIELD OF THE INVENTION

This application is a continuation-in-part of application Ser. Nos. 236,757, filed Feb. 23, 1981 now U.S. Pat. No. 4,438,300; 261,647, filed May 7, 1981 now abandoned; 286,063, filed July 23, 1981 now abandoned; and 299,509, filed Sept. 4, 1981 now U.S. Pat. No. 4,436,965.

This invention relates generally to protective covering devices for use in connection with arrays of key-operated switches, and more specifically, relates to a cover of such character which is particularly adapted for use with a push-button type telephone set, which must be vandal-proof. The invention relates, in particular, to a protective covering device for a push-button coin-operated telephone set.

BACKGROUND OF THE INVENTION

Within recent years, telephone sets incorporating push-button arrays, commonly including twelve such push-buttons, have come into widespread use and have largely supplanted the previously common rotary dial-type telephone. The individual pushbuttons comprising such a telephone set array normally project through the cover of the telephone, or a portion of the telephone cover. The remainder of the switching array is contained beneath this outer shell of the telephone set. Such telephone sets are also employed in coin-operated pay stations which are generally located in high volume traffic areas where they are subject to damage from environmental hazards, including especially dust, liquid, and the like which can readily seep through the openings surrounding the individual push-button keys and cause damage, in some cases irreparable damage, to the underlying switching device. In such installations, there is also a great likelihood of damage resulting from vandalism, and a protective cover which is permanently attached, and not easily removed, allowing operation of the push-buttons is very desirable.

While several types of covering elements have been previously proposed for use in connection with push-button type telephones, these have not addressed the foregoing problem of providing a protective envelopment of the push-button array to prevent damage. For example, patents such as U.S. Pat. Nos. 3,739,105; 3,927,282; 4,002,855; and 3,345,769, have been concerned with a variety of problems including arrangements for facilitating actuation of the buttons by varying spacing of the actuating means for the individual push-buttons, or in the case of the U.S. Pat. No. 3,345,769 patent, providing a means for supporting message pads or the like.

Of further interest in connection with the present invention, is the teaching in the aforementioned U.S. Pat. No. 3,739,105 patent, that the push-buttons on the covering device can be formed to provide a width of material which glows in the dark, thereby facilitating use of the telephone in darkened surroundings.

The problem of providing an adaptation enabling use of a push-button telephone under darkened conditions, such as might be encountered in a dimly-lit pay phone station, is indeed a problem which has been occasionally addressed, but never adequately met. Thus, it may be noted that numerous prior art devices extending back many years and directed toward a similar problem in a rotary dial telephone, have considered use of phosphorescent materials in some manner as to enable limited visibility under darkened conditions as in the mentioned U.S. Pat. No. 3,739,105 patent.

Pursuant to the foregoing, it may be regarded as an object of the present invention to provide a simple, inexpensive to manufacture, cover for use with a push-button dial telephone or the like, which device acts to effectively seal the push-button array against damage, while at the same time providing no interference with use in actuation of the push-buttons.

A further object of the invention is also to provide a cover which can be permanently attached to the face of a push-button coin-operated telephone and which is relatively vandal-proof.

It is a still further object of the present invention to provide a protective cover of the above character which may further include phosphorescent indicia to enable visibility under reduced light conditions.

SUMMARY OF THE INVENTION

In accordance with the invention, a covering element for a switching matrix, including an array of push-buttons arranged in rows and columns displaceable in a cover plate, for example a push-button array of a telephone set, comprises a flexible elastomeric sheet having one or more pockets therein adapted to overlie the coverplate and the buttons. The pocket or pockets have a top portion and side walls which cover the telephone buttons.

In one embodiment, all the buttons can be covered with a single pocket having on its outer surface mesa-like projections corresponding to each of the buttons. Each of those mesa-like projections have indicia thereon corresponding to those on the button.

In another embodiment, each of the buttons is enclosed in a separate pocket which carries on its outer surface indicia corresponding to those on the button. In this embodiment, all the side walls of the pockets are joined together by portions of the sheet to form a complete enclosure. In addition, the sheet has a skirt portion which extends in directions away from the push-button array and is continuous between the lateral edges for covering the entire push-button array.

Surrounding the edges of the sheet is a metal frame having a channel or lip into which the edges are received and securely held. While the sheet can be attached to the coverplate with an adhesive during installation, preferably an adhesive strip, which may extend completely around the periphery of the sheet is provided. A removable cover is placed over this adhesive strip and removed before attaching the sheet.

As a further feature of the invention, each of the indicia can be made of a phosphorescent material which is adapted to glow, or be visible, under low light level or darkened conditions, thus facilitating the use of the push-button array in a darkened environment.

To protect the push-button array on a coin-operated, push-button telephone set, the covering over the adhesive strip is removed and the device is simply placed over the button array. The adhesive is preferably of the pressure-sensitive type, and may be self-curing. A permanent attachment thereby results, and the adhered protective cover is very difficult, if not impossible, to remove, whereby the installation is substantially vandal-proof.

DESCRIPTION OF THE DRAWING

The invention will be described in more detail with reference to the drawing which forms part of this specification and preferred embodiments thereof, these embodiments being illustrative only.

IN THE DRAWING

Figure 7:
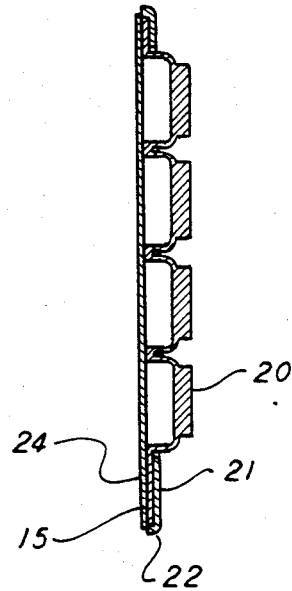
Figure 6:
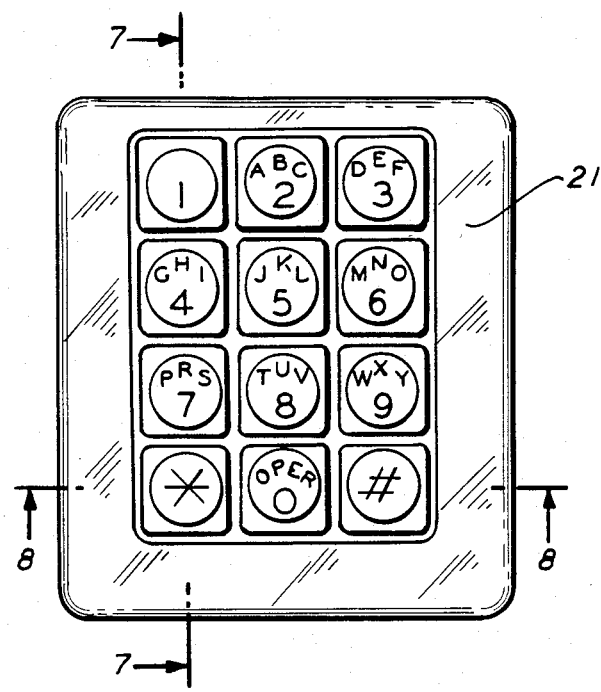
Figure 8:
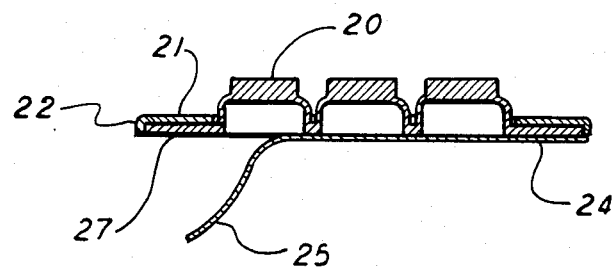

FIGS. 1, 2, and 3 are top and side views, respectively of a prior art protective cover for a push-button telephone set;

FIG. 4 is a side view of a single pocket of the array shown in Figure;

FIG. 5 is a bottom view of the array shown in FIG. 1;

FIG. 6 is a top view of a protective cover for a push-button telephone set according to the invention;

FIG. 7 is a sectional view along the line 7—7 in FIG. 6;

FIG. 8 is a sectional view along the line 8—8 in FIG. 6.

DESCRIPTION OF A PREFERRED EMBODIMENT OF THE INVENTION

While the invention is about to be described in connection with a preferred embodiment showing a protective cover for a push-button telephone coin-operated telephone set, it is to be understood that the protective cover about to be described is applicable to any type of switching matrix employing push-buttons arranged in columns and rows designed to operate in a hostile environment.

The protective covers shown in FIGS. 1 to 5, while suitable for use with a push-button telephone set in general business or residential use, is not vandal-proof because it can be easily removed. Since it is well known that coin-operated telephones are subject to attack and destruction by vandals, the cover according to the invention is designed to be as vandal-proof as possible.

The prior art shown in FIGS. 1 to 5 are the covers made of an elastomeric material such as rubber, or it may be made of a plastic material such as polyvinyl chloride. This cover is designated 10. A number of pockets are provided in the cover, generally shown as 11. Each of these pockets has a top portion 12 and sidewall portion 13, which conform to the shape of the underlying push-button. Adjoining pockets are joined by the material of the cover as shown by 14 in FIG. 4; thus each of the buttons in the push-button aray in a telephone set are adapted to fit into each of the pockets of the cover so that when the cover is placed over the telephone set, all of the push-buttons are covered.

The cover is provided with a skirt 15, which extends beyond the push-button array, the sheet itself being continuous between the lateral edges generally shown as 16, 17, 18 and 19. At the top of each of the pockets, a raised portion or mesa 20 is provided which may be provided with an indicia corresponding to the indicia on the underlying button of the telephone set. The mesa 20 facilitates transfer of the finger motion to the underlying push-button. Such indicia can be directly molded into mesa 20, or can be applied thereto, as by printing or so forth.

Instead of individual pockets, a single pocket covering all the buttons with mesa-like projections carrying indicia corresponding to each of the buttons as described in application Ser. No. 261,647, may be used.

Moreover, the indicia on projecting portion 20 of the pocket can be printed with, coated with, or made of a phosphorescent material which can glow in a darkened environment if properly energized. For example, certain phosphors will glow for a limited time after exposure to ambient light, or may be caused to glow by exposure to ultraviolet radiation.

The covers thus depicted in FIGS. 3 through 5 have heretofore been attached to telephone sets by means of relatively nonpermanent adhesives which extend about the peripheral portions of skirt 15, and which prior to installation may be covered with protective paper. Once secured to the telephone, these covers can be readily removed by simply peeling back the cover, beginning at a corner of same.

In accordance with the present invention, a metal frame 21 covers the skirt portion 15 of the elastomeric sheet. This frame is bent downwardly over at the outer edges to form a lip 22. The elastomeric sheet is permanently molded to the frame to form a unitary assembly.

The under surface of the sheet, at least along the periphery, is covered with an adhesive 27, which is of the pressure-sensitive type, and which can be self-curing, so that the sheet and frame can be secured to the face of telephone set. When the adhesive sets, the elastomeric sheet is virtually unremovable. Particulary to be appreciated is that the metal frame 21 prevents a vandal (or even casual user) from peeling away the cover by starting at a corner of same. Thus, not only does the frame limit access to the edges of cover skirt 15; but moreover because of the frame one would necessarily have to separate the cover from the telephone as a planar unit, which is exceedingly difficult even if the adhesive bond is less than perfect.

Preferably, the adhesive is covered with paper 25, which can be removed by peeling. After the paper is removed, the sheet is placed over the key pad of the telephone set with the pockets aligned with the buttons, and the sheet pressed against the face of the telephone set so that when the adhesive hardens, the cover is permanently in place.

It will thus be appreciated that the push-button array is fully protected against infiltration of foreign matter which would interfere with operation of the telephone switching mechanism, and the said cover is resistant to vandalism.

The foregoing description is of a single preferred embodiment of the invention. Other modifications will be apparent to those skilled in this art without departing from the spirit and scope of the invention as defined in the following claims.

I claim:

1. A protective cover for a push-button array extending through a generally planar surface of a telephone set, each of the push-buttons having indicia thereon, comprising:

a metal frame adapted to fit over the planar surface of the telephone set;

a flexible elastomeric sheet having a grid of upwardly-directed pockets which are adapted to overlie the said push-buttons of the array; each of said pockets being defined by substantially vertical side walls rising above the main plane of said sheet and an upper top portion extending across the tops of said vertical walls, each said pocket thereby extending above the said plane of said sheet and being open at the lower end for receiving each of the buttons of said array and thereby overlying the array of push-buttons on said telephone, said top portion of each said pocket being provided with an upwardly protruding portion, the lateral periphery of which is inward of said vertical side walls, said pockets being elastically depressible independently of one another toward their open ends to permit individual displacement of the underlying telephone set push-buttons received in said pockets; said sheet including a skirt portion extending laterally beyond the side walls of said pockets, and said sheet being continuous between its lateral edges, whereby said entire push-button array may be overlaid by said cover and thereby protected from environmental hazards, said cover being disposed wholly within and permanently secured to said frame; and adhesive means to attach said sheet and frame to said planar surface.

2. A protective cover in accordance with claim 1, wherein said adhesive means comprises a relatively permanent adhesive.

3. A protective cover in accordance with claim 1, wherein said sheet comprises a transparent material, whereby said underlying push-buttons are directly visible.

4. A protective cover in accordance with claims 1, or 2, wherein said sheet includes indicia which overlie and correspond to the indicia on the underlying push-buttons.

5. A device in accordance with claim 1, wherein the upwardly protruding portion has indicia corresponding to indicia on the underlying push-button.

6. A device in accordance with claim 5, wherein the said indicia comprises a phosphorescent material.

7. A protective cover in accordance with claims 1, or 2, wherein the downwardly-facing surface of said skirt-like portion carries an adhesive to enable securing of said cover to the face of said telephone set.

8. A protective cover for a key-actuated switching array which projects through a general planar surface on communications equipment or the like comprising:

a flexible elastomeric sheet having at least one recessed portion with side walls forming a pocket which is adapted to overlie the said array of key-actuated switches whereby each of said key-actuated switches is independently depressible through said sheet, said sheet including a skirt-like portion extending laterally beyond said array, and said sheet being continuous between its lateral edges, whereby said entire key switch array may be overlaid by said pocket, with said skirt-like portion contacting said planar surface, said array thereby being protected from environmental hazards;

a metal frame surrounding said flexible sheet and to which said flexible sheet is permanently secured; and adhesive means to attach said combination of metal frame and sheet permanently to said planar surface to prevent removal thereof by unauthorized persons.

9. A protective cover in accordance with claim 7, wherein the downwardly-facing surface of said skirt-like portion carries pressure sensitive adhesive portions, to enable securing of said device to the said generally planar surface of apparatus carrying the said array of key operated switches.

10. A protective cover in accordance with claim 9 wherein the pressure sensitive adhesive portion extends completely about the periphery of the flexible sheet.

11. A protective cover as claimed in claims 1, 2, or 5, in which the adhesive means is covered with a removable protective material before securing the flexible sheet to the face of the telephone set.

12. A protective cover is claimed in claims 1, or 2 in which the metal frame is folded over the edges of the flexible sheet and is securely attached thereto.

13. A protective cover for a push-button array extending through a generally panar surface of a telephone set, each of said push-buttons having indicia thereon, comprising:

a generally rectangular metal frame adapted to fit over the panar surface and surrounding the push-button array, said frame being formed at its periphery into a lip extending toward the said planar surface of the telephone set;

a flexible elastomeric sheet having a grid of upwardly-directed pockets which are adapted to individually overlie each push-button of the array; each of said pockets being defined by substantially vertical side walls rising above the main plane of said sheet and an upper top portion extending across the tops of said vertical walls, each said pocket thereby extending above the said plane of said sheet and being open at the lower end for receiving each of the buttons of said array and thereby overlying the array of push-buttons on said telephone, said top portion of each said pocket being provided with an upwardly protruding portion, the lateral periphery of which is inward of said vertical side walls, said pockets being elastically depressible independently of one another toward their open ends to permit individual displacement of the underlying telephone set push-buttons received in said pockets; said sheet including a skirt portion extending laterally beyond the push-button array, said sheet being continuous between its lateral edges, said sheet extending into and being secured in the lip in said frame to form a unitary assembly which can overlie and cover the entire push-button array and thereby prevent environmental hazards from entering and interfering with the operation thereof;

a strip of adhesive material extending completely around the periphery of the flexible sheet within the frame for permanently attaching the sheet and frame to the planar surface; and a removable layer of material covering the adhesive material which can be removed before the flexible sheet is secured to the planar surface.

14. A protective cover as claimed in claim 13 in which each of the pockets overlying the push-buttons have indicia which overlie and correspond to the indicia on the underlying push-buttons.

15. A protective cover as claimed in claim 14 in which each of the indicia on the pockets comprises a phosphorescent material.

16. A protective cover as claimed in claim 13, 14, or 15, in which the adhesive material is relatively permanent.

* * * * *